US012810585B2

(12) United States Patent
Takehara et al.

(10) Patent No.: US 12,810,585 B2
(45) Date of Patent: Nov. 24, 2026

(54) IMAGE PROCESSING APPARATUS, IMAGE PROCESSING METHOD, AND NON-TRANSITORY COMPUTER-READABLE MEDIUM HAVING IMAGE PROCESSING PROGRAM

(71) Applicant: JVCKENWOOD Corporation, Yokohama (JP)

(72) Inventors: Hideki Takehara, Yokohama (JP); Shingo Kida, Yokohama (JP); Yincheng Yang, Yokohama (JP); Maki Takami, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 326 days.

(21) Appl. No.: 18/588,056

(22) Filed: Feb. 27, 2024

(65) Prior Publication Data

US 2024/0212323 A1 Jun. 27, 2024

Related U.S. Application Data

(63) Continuation of application No. PCT/JP2022/021174, filed on May 24, 2022.

(30) Foreign Application Priority Data

Aug. 31, 2021 (JP) ................................. 2021-140819

(51) Int. Cl.
*G06V 10/764* (2022.01)
*G06V 10/82* (2022.01)

(52) U.S. Cl.
CPC ............ *G06V 10/764* (2022.01); *G06V 10/82* (2022.01)

(58) Field of Classification Search
None
See application file for complete search history.

(56) References Cited

U.S. PATENT DOCUMENTS 10,055,685 B1 * 8/2018 Arel ........................ G06N 20/00
10,325,223 B1 * 6/2019 Arel ........................ G06N 3/084
(Continued)

FOREIGN PATENT DOCUMENTS

WO WO2107145852 A1 8/2017

OTHER PUBLICATIONS

Chen, Wei-Yu, et al. "A closer look at few-shot classification." arXiv preprint arXiv:1904.04232 (2019). (Year: 2019).*
(Continued)

*Primary Examiner* — Samah A Beg
(74) *Attorney, Agent, or Firm* — Shih IP Law Group, PLLC

(57) ABSTRACT

A basic class selection unit selects, in response to input data, a base class based on an embedding vector output by a basic neural network that has learned the base class and a centroid vector of the base class. A continual learning unit continually learns an additional class by using an additional neural network that has learned the base class. An additional class selection unit selects, in response to the input data, an additional class based on an embedding vector output by the additional neural network subjected to continual learning and centroid vectors of the base class and the additional class. A classification determination unit classifies the input data based on the base class selected by the base class selection unit and the additional class selected by the additional class selection unit.

5 Claims, 4 Drawing Sheets

(56) References Cited

U.S. PATENT DOCUMENTS

| | | | | |
|---|---|---|---|---|
| 10,922,788 | B1 * | 2/2021 | Yu | G06T 1/20 |
| 12,406,483 | B2 * | 9/2025 | Shim | G06V 10/764 |
| 12,468,952 | B2 * | 11/2025 | Li | G06V 10/774 |
| 2021/0150345 | A1 * | 5/2021 | Abati | G06N 3/09 |
| 2022/0138511 | A1 * | 5/2022 | Xu | G06N 3/082 706/15 |
| 2024/0112455 | A1 * | 4/2024 | He | G06V 10/761 |
| 2024/0202515 | A1 * | 6/2024 | Karunaratne | G06N 3/0464 |
| 2024/0330703 | A1 * | 10/2024 | Kida | G06N 3/045 |
| 2024/0338605 | A1 * | 10/2024 | Kida | G06N 20/00 |

OTHER PUBLICATIONS

Ren, Haopeng, et al. "A two-phase prototypical network model for incremental few-shot relation classification." Proceedings of the 28th international conference on computational linguistics. 2020. (Year: 2020).*

Afrasiyabi, Arman, Jean-François Lalonde, and Christian Gagné. "Associative alignment for few-shot image classification." European conference on computer vision. Cham: Springer International Publishing, 2020. (Year: 2020).*

Zhao, et al, "MgSvF: Multi-Grained Slow vs. Fast Framework for Few-Shot Class-Incremental Learning", IEEE Transactions on Pattern Anaylsis and Machine Intelligence, Mar. 2021, 11 pages.

Lu Yu, et al, "Semantic Drift Compensation for Class-Incremental Learning", Apr. 1, 2020, 14 pages, https://github.com/yulu0724/SDC-IL.

Thomas Mensink, et al, "Distance-Based Image Classification: Generalizing to new classes at near-zero cost", IEEE Transactions on Pattern Analysis and Machine Intelligence, Institute of Electrical and Electronics Engineers, 2013, 35 (11), pp. 2624-2637, 10.1109/TPAMI.2013.83. HAL Id: hal-00817211.

International Preliminary Report on Patentability from International Application No. PCT/JP2022/021174 mailed Mar. 5, 2024, 8 pages.

International Search Report from International Application No. PCT/JP2022/021174 mailed Aug. 9, 2022, 4 pages.

* cited by examiner

FIG. 3

| LAYER NAME | OUTPUT SIZE | 18 LAYERS |
|---|---|---|
| CONV-1 | 112×112 | 7×7, 64, stride 2 |
| CONV-2 | 56×56 | 3×3 max pool, stride 2 |
| | | $\begin{bmatrix} 3\times3, 64 \\ 3\times3, 64 \end{bmatrix}\times2$ |
| CONV-3 | 28×28 | $\begin{bmatrix} 3\times3, 128 \\ 3\times3, 128 \end{bmatrix}\times2$ |
| CONV-4 | 14×14 | $\begin{bmatrix} 3\times3, 256 \\ 3\times3, 256 \end{bmatrix}\times2$ |
| CONV-5 | 7×7 | $\begin{bmatrix} 3\times3, 512 \\ 3\times3, 512 \end{bmatrix}\times2$ |
| | 1×1 | average pool, 1000-d fc, softmax |

IMAGE PROCESSING APPARATUS, IMAGE PROCESSING METHOD, AND NON-TRANSITORY COMPUTER-READABLE MEDIUM HAVING IMAGE PROCESSING PROGRAM

CROSS REFERENCE TO RELATED APPLICATION

This application is a continuation of application No. PCT/JP2022/021174, filed on May 24, 2022, and claims the benefit of priority from the prior Japanese Patent Application No. 2021-140819, filed on Aug. 31, 2021, the entire content of which is incorporated herein by reference.

BACKGROUND OF THE INVENTION

1. Field of the Invention

The present disclosure relates to an image processing technology based on machine learning.

2. Description of the Related Art

Human beings can learn new knowledge through experiences over a long period of time and can maintain old knowledge without forgetting it. Meanwhile, the knowledge of a convolutional neutral network (CNN) depends on the dataset used in learning. To adapt to a change in data distribution, it is necessary to re-train CNN parameters in response to the entirety of the dataset. In CNN, the precision estimation for old tasks will be decreased as new tasks are learned. Thus, catastrophic forgetting cannot be avoided in CNN. Namely, the result of learning old tasks is forgotten as new tasks are being learned in successive learning.

Incremental learning or continual learning is proposed as a scheme to avoid catastrophic forgetting. Continual learning is a learning method that improves a current trained model to learn new tasks and new data as they occur, instead of training the model from scratch. One scheme of continual learning is known as regularization-based continual learning, in which learning is performed by using regularization loss (PATENT LITERATURE 1).

PATENT LITERATURE 1: WO2017/145852

NON-PATENT LITERATURE 1: Thomas Mensink, Jakob Verbeek, Florent Perronnin, Gabriela Csurka, "Distance-Based Image Classification: Generalizing to new classes at near-zero cost", IEEE Transactions on Pattern Analysis and Machine Intelligence, Institute of Electrical and Electronics Engineers, 2013, 35 (11), pp. 2624-2637

NON-PATENT LITERATURE 2: Lu Yu, Bartlomiej Twardowski, Xialei Liu, Luis Herranz, Kai Wang, Yongmei Cheng, Shangling Jui, Joost van de Weijer, "Semantic Drift Compensation for Class-Incremental Learning", 2020 Computer Vision and Pattern Recognition, pp 6982-6991

NON-PATENT LITERATURE 3: Hanbin Zhao, Yongjian Fu, Mintong Kang, Qi Tian, Fei Wu, Xi Li, "MgSvF: Multi-Grained Slow vs. Fast Framework for Few-Shot Class-Incremental Learning", arXiv: 2006.15524, 2021

The technology described in PATENT LITERATURE 1 has a problem in that catastrophic forgetting cannot be sufficiently reduced.

SUMMARY OF THE INVENTION

An image processing apparatus according to an embodiment includes: a base class selection unit that selects, in response to input data, a base class based on an embedding vector output by a base neural network that has learned the base class and a centroid vector of the base class; a continual learning unit that continually learns an additional class by using an additional neural network that has learned the base class; an additional class selection unit that selects, in response to the input data, an additional class based on an embedding vector output by the additional neural network subjected to continual learning and centroid vectors of the base class and the additional class; and a classification determination unit that classifies the input data based on the base class selected by the base class selection unit and the additional class selected by the additional class selection unit.

Another embodiment of this embodiment relates to an image processing method. The method includes: selecting, in response to input data, a base class based on an embedding vector output by a base neural network that has learned the base class and a centroid vector of the base class; continually learning an additional class by using an additional neural network that has learned the base class; selecting, in response to the input data, an additional class based on an embedding vector output by the additional neural network subjected to continual learning and centroid vectors of the base class and the additional class; and classifying the input data based on the base class selected by the selecting of a base class and the additional class selected by the selecting of an additional class.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

The disclosure will be described with reference to the following drawings.

FIG. 3 is a diagram illustrating the structure of a neural network model used in the base neural network processing unit and the additional neural network processing unit of FIG. 1.

DESCRIPTION OF EMBODIMENTS

The invention will now be described by reference to the preferred embodiments. This does not intend to limit the scope of the present invention, but to exemplify the invention.

Figure 1:
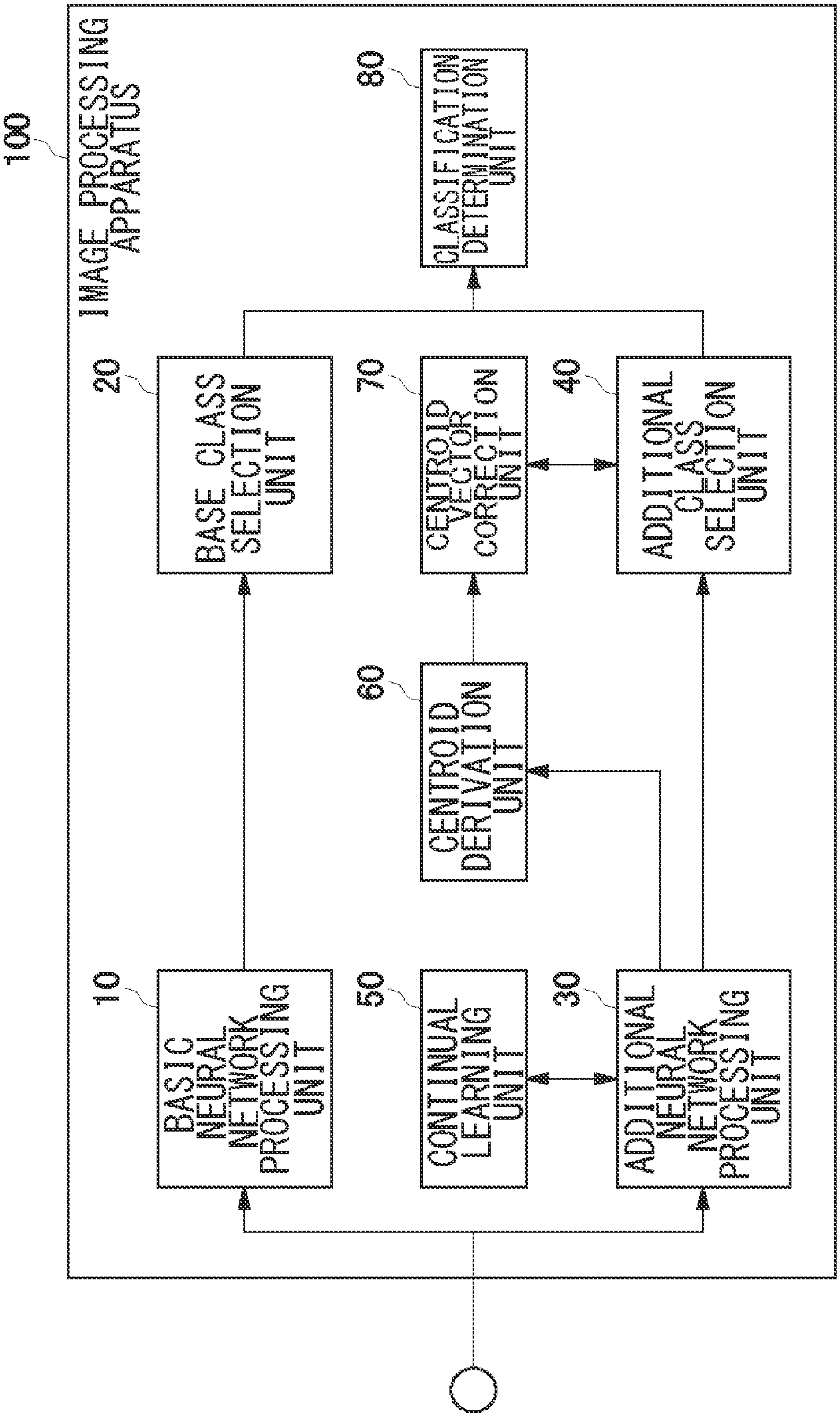
FIG. 1 is a configuration diagram of an image processing apparatus 100 according to the embodiment.

FIG. 1 is a configuration diagram of an image processing apparatus 100 according to the embodiment. The image processing apparatus 100 includes a base neural network processing unit 10, a base class selection unit 20, an additional neural network processing unit 30, an additional class selection unit 40, a continual learning unit 50, a centroid derivation unit 60, a centroid vector correction unit 70, and a classification determination unit 80.

In this embodiment, machine learning in which continual learning and metric learning are combined is performed. An image will be described here as an example of input data, but the input data is not limited to an image. Metric learning is known as a method of learning a embedding space (feature space) by considering the relationship between images (see, for example, NON-PATENT LITERATURE 1). Metric learning is used in various fields such as information retrieval, data classification, and image recognition. Continual learning that uses regularization loss for the purpose of learning can be combined with metric learning that uses metric loss.

In this embodiment, class incremental learning, which is a type of continual learning, is used (see, for example, NON-PATENT LITERATURE 2, NON-PATENT LITERATURE 3). NON-PATENT LITERATURE 2 teaches performing class incremental learning in one neural network. NON-PATENT LITERATURE 3 teaches performing class incremental learning in two neural networks having different learning rates to perform classification in a connected feature space in which the feature spaces of the two neural networks are connected.

In this embodiment, the base neural network that has learned a base class is not changed, and an additional neural network that has learned the base class and continues to learn an additional class is updated. Classification (class selection) is applied to the input image by using the base neural network and the additional neural network, respectively, and the input image is classified into a class with a higher accuracy (closer distance).

Figure 2:
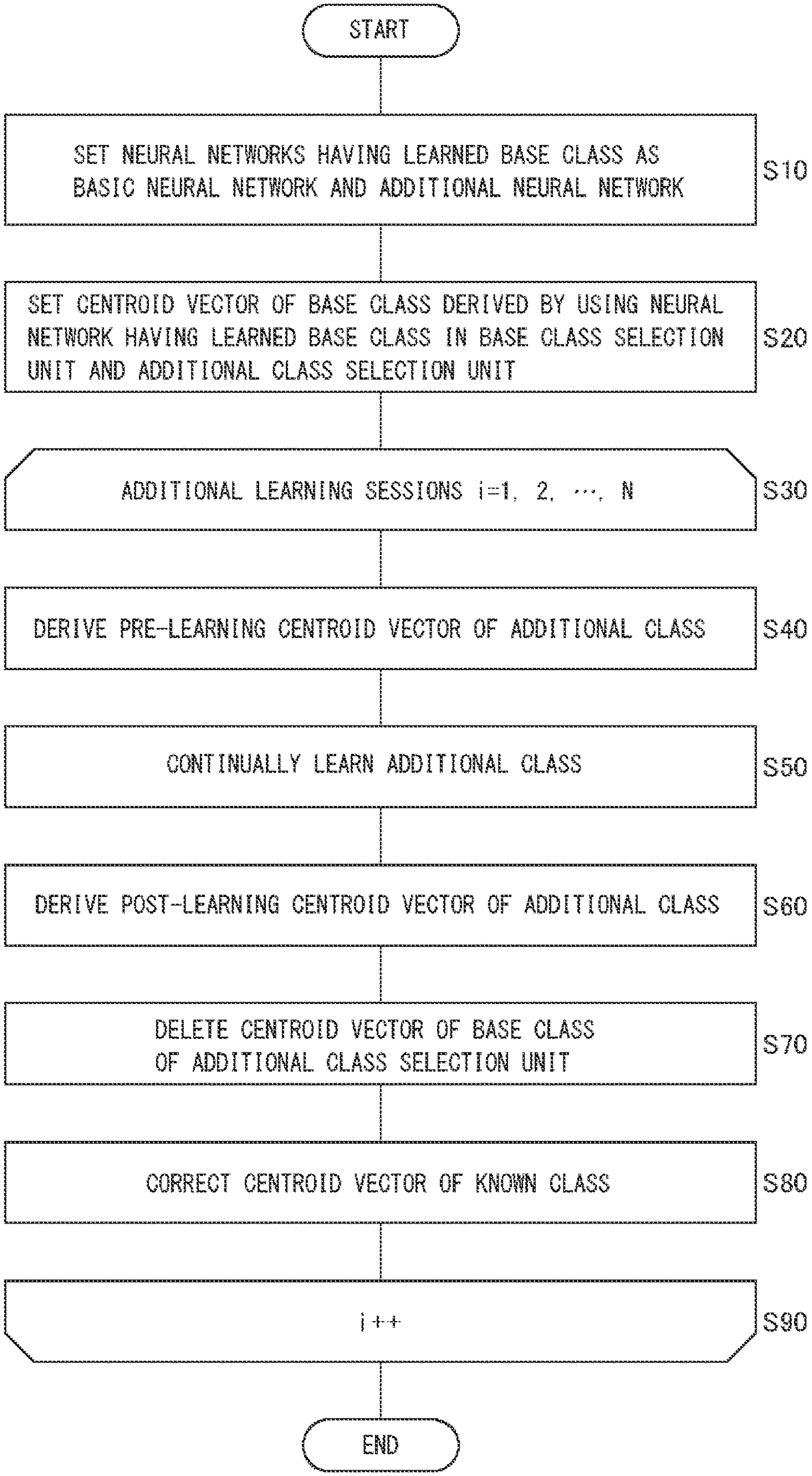
FIG. 2 is a flowchart illustrating a continual learning process performed by the image processing apparatus of FIG. 1.

FIG. 2 is a flowchart illustrating continual learning by the image processing apparatus 100. The configuration and overall operation of continual learning will be described with reference to FIGS. 1 and 2.

First, a neural network that has learned the base class and the centroid vector of the base class derived by using the neural network are acquired. The neural network that has learned the base class may be acquired from a network, or a neural network may be trained by using a dataset including the base class. It is desirable that the neural network that has learned the base class is not trained for classification learning but trained for metric learning (embedding learning). The centroid vector of the base class may be acquired from the network. Alternatively, an image of the base class may be input to a trained neural network, and the centroid vector of each class may be derived by determining, for each class, the centroid of the embedding vectors output from the trained neural network. The number of centroid vectors per class is assumed to be 1 but may be plural.

The neural network that has learned the base class is set to be the base neural network processing unit 10 and the additional neural network processing unit 30 (S10).

The centroid vector of the base class derived by using the neural network that has learned the base class is set in the base class selection unit 20 and the additional class selection unit 40 (S20). The base class selection unit 20 and the additional class selection unit 40 store the centroid vector of the base class, respectively.

Next, a learning session i, which is continual learning, is repeated N times (i=1, 2, . . . , N) (S30).

First, the additional neural network processing unit 30 inputs all images of each additional class included in an additional training dataset to the additional neural network prior to the learning session i, thereby deriving embedding vectors in all images of the additional class. The centroid derivation unit 60 derives the centroid vector of the additional class from the embedding vectors of all images of the additional class (S40). The centroid vector of the additional class in this case is the pre-learning centroid vector. It is noted that the centroid vector of the additional class is derived for all additional classes.

The continual learning unit 50 then proceeds to the learning session i and subjects the additional neural network to continual learning by using the additional training dataset including the additional class (S50).

The additional neural network processing unit 30 then inputs all images of each additional class included in the additional training dataset to the additional neural network subjected to the learning session i, thereby deriving embedding vectors in all images of the additional class. The centroid derivation unit 60 derives the centroid vector of the additional class from the embedding vectors of all images of the additional class (S60). The centroid vector of the additional class in this case is the post-learning centroid vector. It is noted that the centroid vector of the additional class is derived for all additional classes.

The additional class selection unit 40 then deletes the centroid vector of the base class stored (S70). It is assumed here that the number of centroid vectors of the base classes deleted is the number of additional classes added in learning session I. It is assumed that the centroid vector of the base class to be deleted is the one nearest the centroid vector of the additional class added in the learning session i. After all the centroid vectors of the selected base classes are deleted, the centroid vectors are not deleted. This ensures that the number of centroid vectors stored by the base class selection unit 20 and the number of centroid vectors stored by the additional class selection unit 40 are identical.

The centroid vector correction unit 70 then corrects the centroid vector of known classes stored by the additional class selection unit 40 (S80). The known classes include base classes and additional classes in the learning session (i−1). Additional classes in learning session i do not need to be corrected. i is incremented by 1 (S90), control is returned to step S30, steps S40-S80 are repeated until i=N, and the process is ended when i exceeds N.

For correction of the centroid vector of the learned (known) class, the method described with reference to FIG. 3 in NON-PATENT LITERATURE 2 is used with improvements.

The centroid vector correction unit 70 corrects the centroid vector of the learned class based on the centroid vector of the class prior to continuation learning and the centroid vector of the class subsequent to continuation learning within a predetermined distance from the centroid vector of the learned class (known class). Specifically, the centroid vector correction unit 70 determines the amount of movement from the centroid vector of the class prior to continual learning to the centroid vector of the class subsequent to continual learning and calculates the average movement amount by referring to the amounts of movement. The centroid vector correction unit 70 corrects the centroid vector of the learned class by adding the average movement amount to the centroid vector of the learned class.

In NON-PATENT LITERATURE 2, a pre-learning embedding vector within the radius R of the centroid vector of a known class is used for correction. This embodiment differs in that both the centroid vector of the class prior to continual learning and the centroid vector of the class subsequent to continual learning are used for correction. Calculation of the average movement amount will be less affected by fine image-to-image fluctuations by using a large number of centroid vectors. In this embodiment, therefore, both the centroid vector of the class prior to continual learning and the centroid vector of the class subsequent to continual learning within a predetermined distance from the centroid vector of the learned class are used for correction.

The configuration and operation of the continual learning unit 50 will be described in further detail.

The base training dataset is a supervised dataset including a large number of base classes (e.g., about 100 to 1000 classes), wherein each class is comprised of a large number of images (e.g., 3000 images). The base training dataset is assumed to have a sufficient amount of data to allow learning a general classification task alone.

On the other hand, the additional training dataset is a supervised dataset including a small number of additional classes (e.g., about 2 to 10 classes), wherein each additional class is comprised of a small number of images (e.g., about 1 to 5 images). Training data comprised of a set of three images, including an anchor image belonging to a given class, a positive image belonging to the same class as the anchor image, and a negative image belonging to a class different from that of the anchor image, is input to the neural network that should be trained. The reason that two classes are assumed as a small number of classes is that a class that contains negative images and that is not learned is necessary even if the number of classes learned is one. It is assumed here that the set includes a small number of images but may include a large number of images provided that the number of classes is small.

FIG. 3 is a diagram illustrating the structure of a neural network model used in the base neural network processing unit 10 and the additional neural network processing unit 30. The neural network is a deep neural network that includes a convolutional layer and a pooling layer and does not include a fully connected layer. The network is configured to include CONV-1 to CONV-5, which are ResNet-18 convolutional layers shown in FIG. 3, followed by a global average pooling layer. The network outputs 512 dimensional embedding vectors.

The continual learning unit 50 calculates the total loss L as given by the following expression by adding the metric loss Lml and the regularization loss Lr. The continual learning unit 50 trains the neural network so as to minimize the overall loss L.

$$L = \sum (Lml + Lr)$$

where Σ indicates taking a sum with for an input image.

Triplet loss is used as metric loss. The triplet loss Lml is calculated by the following expression based on the embedding vector of the anchor image, the embedding vector of the positive image, and the embedding vector of the negative image.

$$Lml = dp - dn + \alpha$$

where dp denotes the Euclidean distance between the embedding vector of the anchor image and the embedding vector of the positive image. dn denotes the Euclidean distance between the embedding vector of the anchor image and the embedding vector of the negative image. α is the offset.

The regularization loss Lr is an embedding vector loss Lrv as given by the following expression for minimizing the difference between embedding vectors output before and after the learning session when an image is input to the neural network.

$$Lrv = \|V(i) - V(i-1)\|$$

where V (i) denotes an embedding vector output by the neural network in the learning session i. V(i−1) is the embedding vector output by the neural network in the learning session (i−1). ||•|| is a symbol that indicates the meaning of calculating a Frobenius norm.

Figure 4:
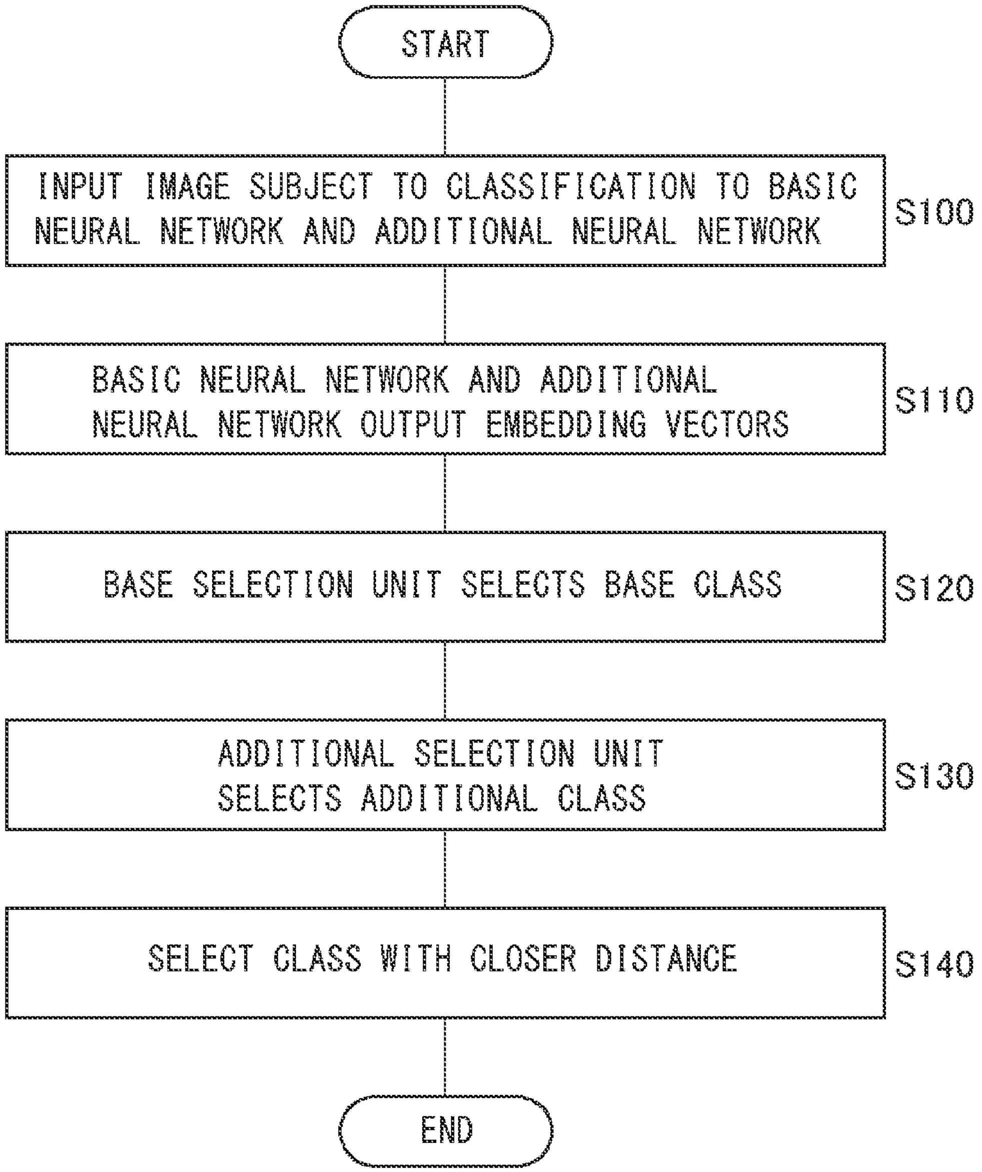
FIG. 4 is a flowchart illustrating a classification determination process performed by the image processing apparatus of FIG. 1.

FIG. 4 is a flowchart illustrating classification determination by the image processing apparatus 100. With reference to FIGS. 1 and 4, the configuration and overall operation of classification determination will be described.

The base neural network processing unit 10 inputs an image subject to classification to the base neural network, and the additional neural network processing unit 30 inputs the image subject to classification to the additional neural network subjected to continual learning (S100).

The base neural network processing unit 10 supplies the embedding vector of the image subject to classification output from the base neural network to the base class selection unit 20. The additional neural network processing unit 30 supplies the embedding vector of the image subject to classification output from the additional neural network to the additional class selection unit 40 (S110).

The base class selection unit 20 selects a base class based on the base embedding vector output by the base neural network (S120). Specifically, a base class having a centroid vector closest to the base embedding vector is selected.

The additional class selection unit 40 selects an additional class based on the additional embedding vector output by the additional neural network (S130). Specifically, an additional class having a centroid vector closest to the additional embedding vector is selected. The additional class selection unit 40 does not select a base class even if the class having a centroid vector closest to the additional embedding vector is a base class.

The classification determination unit 80 compares the base class selected by the base class selection unit 20 and the additional class selected by the additional class selection unit 40 and determines the class characterized by the closest distance between the centroid vector and the embedding vector to be class resulting from classification of the image subject to classification (S140). A reciprocal of the distance between the centroid vector and the embedding vector may be taken and treated as if it indicates a probability. Relative magnitude of the probability may be examined, and the class associated with a higher probability may be determined to be the class resulting from classification. When the distance between the centroid vector and the embedding vector is the same between the selected base class and the selected additional class, the additional class is selected as the class resulting from classification.

(Variation)

A variation of the additional class selection unit 40 and the classification determination unit 80 will be described. Only the operations that differ from those of the embodiment will be described. The additional class selection unit 40 selects the centroid vector having the closest distance to the additional embedding vector regardless of whether the class is a base class or an additional class. When the base class selected by the base class selection unit 20 and the base class selected by the additional class selection unit 40 are different, the classification determination unit 80 selects the base class selected by the base class selection unit 20 as the class resulting from classification. The reason that the classification determination unit 80 selects the base class selected by the base class selection unit 20 as the class resulting from classification is that the base neural network has learned more data for the base class. That is, the classification determination unit 80 selects the classification result of the neural network trained with more data.

The above-described various processes in the image processing apparatus 100 can of course be implemented by hardware-based apparatuses such as a CPU and a memory and can also be implemented by firmware stored in a ROM (read-only memory), a flash memory, etc., or by software on a computer, etc. The firmware program or the software program may be made available on, for example, a computer readable recording medium. Alternatively, the program may be transmitted and received to and from a server via a wired or wireless network. Still alternatively, the program may be transmitted and received in the form of data broadcast over terrestrial or satellite digital broadcast systems.

As described above, according to the image processing apparatus 100 of this embodiment, the base neural network is not subject to continual learning and so does not forget the base class. Even if the learning session progresses, therefore, the base neural network can classify into the base class with a high probability. Since the base neural network does not continually learn an additional class, the base neural network cannot select an additional class. However, the additional neural network can learn the base class and the additional class such that the features of both are considered and can select an additional class, by continually learning the additional class in addition to the base class.

According to this embodiment, the result of classification by the base neural network that does not forget the base class and the result of classification by the additional neural network trained to learn the additional class continually are evaluated, and the result of classification having a higher accuracy is selected. Accordingly, it is possible to mitigate catastrophic forgetting and improve accuracy of classification at the same time.

In the case the additional neural network learns only the additional class, the centroid vector of the additional class is likely to be overfitted because the number of data items in the additional class is small. Also, it is highly likely that the centroid vector is overcorrected. In the training of the additional neural network, therefore, it is possible to prevent the centroid vector of the additional class and correction of the centroid vector from varying significantly through overfitting and to reduce overfitting to the centroid vector of the additional class and correction of the centroid vector, by considering, along with the additional class, the embedding vector output by the base neural network that has learned the base classes with more data.

Further, by keeping the total number of classes comprising the base classes and the additional classes in the additional class selection unit 40 constant, the embedding spaces of the base neural network and the additional neural network can be kept at similar densities, and the distance in the embedding space of the base class selection unit 20 and the additional class selection unit 40 can be dealt with as being similar. It is possible to prevent a bias in class selection from being created between the base class selection unit 20 and the additional class selection unit 40.

Described above is an explanation based on an exemplary embodiment. The embodiment is intended to be illustrative only and it will be understood by those skilled in the art that various modifications to combinations of constituting elements and processes are possible and that such modifications are also within the scope of the present invention.

What is claimed is:

1. An image processing apparatus comprising:

a base class selection unit that selects, in response to input data, a base class based on an embedding vector output by a base neural network that has learned the base class and a centroid vector of the base class;

a continual learning unit that continually learns an additional class by using an additional neural network that has learned the base class;

an additional class selection unit that selects, in response to the input data, an additional class based on an embedding vector output by the additional neural network subjected to continual learning and centroid vectors of the base class and the additional class;

a classification determination unit that classifies the input data based on the base class selected by the base class selection unit and the additional class selected by the additional class selection unit;

a centroid derivation unit that derives a centroid vector from an embedding vector output by the additional neural network; and a centroid vector correction unit that corrects a centroid vector of a class known before continual learning based on the centroid vector before continual learning and the centroid vector after continual learning derived by the centroid derivation unit.

2. The image processing apparatus according to claim 1, wherein the additional class selection unit deletes centroid vectors of the base classes, the number of centroid vectors deleted being equal to the number of additional classes in continual learning.

3. The image processing apparatus according to claim 1, wherein the classification determination unit determines the base class selected by the base class selection unit to be a result of classification, when a class selected by the additional class selection unit is a base class and when the base class selected by the additional class selection unit and the base class selected by the base class selection unit differ.

4. An image processing method comprising:

selecting, in response to input data, a base class based on an embedding vector output by a base neural network that has learned the base class and a centroid vector of the base class;

continually learning an additional class by using an additional neural network that has learned the base class;

selecting, in response to the input data, an additional class based on an embedding vector output by the additional neural network subjected to continual learning and centroid vectors of the base class and the additional class; and classifying the input data based on the base class selected by the selecting of a base class and the additional class selected by the selecting of an additional class;

deriving a centroid vector from an embedding vector output by the additional neural network; and correcting a centroid vector of a class known before continual learning based on the centroid vector before continual learning and the centroid vector after continual learning derived by the deriving the centroid vector.

5. A non-transitory computer-readable medium having an image processing program comprising computer-implemented modules including:

a module that selects, in response to input data, a base class based on an embedding vector output by a base neural network that has learned the base class and a centroid vector of the base class;

a module that continually learns an additional class by using an additional neural network that has learned the base class;

a module that selects, in response to the input data, an additional class based on an embedding vector output by the additional neural network subjected to continual learning and centroid vectors of the base class and the additional class; and a module that classifies the input data based on the base class selected by the module that selects a base class and the additional class selected by the module that selects an additional class;

a module that derives a centroid vector from an embedding vector output by the additional neural network; and a module that corrects a centroid vector of a class known before continual learning based on the centroid vector before continual learning and the centroid vector after continual learning derived by the module that derives the centroid vector.

* * * * *